United States Patent
Haverinen et al.

(10) Patent No.: US 7,617,524 B2
(45) Date of Patent: Nov. 10, 2009

(54) PROTECTION AGAINST DENIAL-OF-SERVICE ATTACKS

(75) Inventors: Henry Haverinen, Jyväskylä (FI); Pasi Eronen, Helsinki (FI)

(73) Assignee: Nokia Corporation, Espoo (FI)

( * ) Notice: Subject to any disclaimer, the term of this patent is extended or adjusted under 35 U.S.C. 154(b) by 764 days.

(21) Appl. No.: 11/256,157

(22) Filed: Oct. 24, 2005

(65) Prior Publication Data

US 2006/0282880 A1    Dec. 14, 2006

(30) Foreign Application Priority Data

Jun. 14, 2005   (EP)   .................. 05012763

(51) Int. Cl.
*H04L 29/06*   (2006.01)
(52) U.S. Cl. ........................... 726/6; 726/18
(58) Field of Classification Search ............ 726/1, 726/6, 7, 18, 19
See application file for complete search history.

(56) References Cited

U.S. PATENT DOCUMENTS 6,373,949 B1 * 4/2002 Aura ..................... 380/247

7,421,503 B1 * 9/2008 Stieglitz et al. ............ 709/229

OTHER PUBLICATIONS

3GPP—TS 33.234 V6.4.0, "3$^{rd}$ Generation Partnership Project; Technical Specification Group Service and System Aspects; 3G Security; Wireless Local Area Network (WLAN) interworking security", Mar. 2005, pp. 1-85.
H. Haverinen, Ed. (Nokia) J. Salowey, Ed. (Cisco Systems), "Extensible Authentication Protocol Method for GSM Subscriber Identity Modules (EAP-SIM)", Dec. 21, 2004, pp. 1-85.

\* cited by examiner

*Primary Examiner*—Gilberto Barron, Jr.
*Assistant Examiner*—Cordelia Kane
(74) *Attorney, Agent, or Firm*—Harrington & Smith, PC

(57) ABSTRACT

The invention proposes a method for handling authentication requests in a network, wherein the authentication requests may have different types, the method comprising the steps of determining (S1, S3, S4) types of the authentication requests, and applying (S5-S7) a policy for handling the received authentication requests based on the determined types of authentication requests. The invention also proposes a corresponding network control element and a computer program product.

28 Claims, 3 Drawing Sheets

PROTECTION AGAINST DENIAL-OF-SERVICE ATTACKS

BACKGROUND OF THE INVENTION

1. Field of the Invention

The invention relates to a method and a network device for handling authentication requests, and is in particular related to the problem of Denial-of-Service attacks caused by fake authentication request.

2. Description of the related art

Denial-of-Service (DoS) attacks may be a problem in almost any kind of networks. In the following, this problem is described using Unlicensed Mobile Access (UMA) as an example. The 3rd Generation Partnership Project's (3GPP) Wireless Local Area Network (WLAN) Interworking is used as another example.

Unlicensed Mobile Access (UMA) technology provides access to GSM and GPRS mobile services over unlicensed spectrum technologies, including Bluetooth and IEEE 802.11. UMA specifications are available at "http://www.umatechnology.org".

In the following, the basic architecture of UMA is described by referring to FIG. 1. As illustrated, a terminal, e.g., a mobile station MS 1 obtains access to a core mobile network 3 via an Unlicensed Mobile Access Network (UMAN) 2. In detail, the mobile station 1 is connected to an Access Point (AP) 21, for example via Bluetooth or Wireless Local Area Network (WLAN, IEEE 802.11), as described above. A connection between the AP 21 and an UMA network controller (UNC) 23 is provided via a broadband Interned Protocol (IP) network 22. It is noted that the specific UMA features apply basically only for the MS 1 and the UNC 23, so that for the AP 21 any generic AP may be used.

The UNC provides functions which are basically equivalent to that of a Radio Access Network (RAN) base station controller. It comprises a Security Gateway (SGW) 231 that terminates secure remote access tunnels from the MS, providing mutual authentication, encryption and data integrity for signalling, voice and data traffic.

In more detail, the terminal 1 accesses the UMA service over an IPsec (Internet Protocol Security) VPN (Virtual Private Network) tunnel which is provided via the AP 21 and the broadband IP network 22. The subscriber is authenticated using the Internet Key Exchange version 2 (IKEv2) protocol and the Extensible Authentication Protocol method for GSM Subscriber Identity Modules (EAP-SIM). The UMA network controller (UNC), in detail the SGW, operates as an Extensible Authentication Protocol (EAP) authenticator, and forwards the EAP packets between the terminal and an AAA (Authentication, Authorisation and Accounting) server 31 of the core mobile network 5. The EAP-SIM server functionality is implemented in the AAA server. In order to run EAP-SIM authentication, the EAP-SIM server needs to be able to obtain GSM triplets (RAND random challenge, Kc key, SRES response) from the Authentication Centre (AuC) which is associated with the GSM Home Location Register (HLR).

The Extensible Authentication Method for 3rd Generation Authentication and Key Agreement (EAP-AKA) is another EAP method based on cellular authentication. In the future, EAP-AKA may be used also in the UMA system for subscriber authentication.

In the following, the EAP-SIM and EAP-AKA authentication exchanges and the identity format are described in more detail. The EAP-SIM and EAP-AKA protocols support two types of authentication exchanges, namely the full authentication exchange and the fast re-authentication exchange. The full authentication exchange makes use of the GSM triplets or 3G authentication vectors, and the (U)SIM card. The fast re-authentication exchange is based on the keying material derived on a previous full authentication exchange. To run the fast re-authentication exchange, the EAP server does not need to contact the HLR/AuC.

In the beginning of an EAP-SIM or EAP-AKA authentication exchange, the terminal sends a peer identity to the network. The identity is of the Network Access Identifier (NAI) format ("username@realm"). There are three types of usernames in EAP-SIM and EAP-AKA peer identities:

(1) Permanent Usernames.

For example, 1123456789098765@myoperator.com might be a valid permanent identity. In this example, 1123456789098765 is the permanent username. In the UMA environment, the permanent username is derived from the International Mobile Subscriber Identity (IMSI).

(2) Pseudonym Usernames.

For example, 3s7ah6n9q@myoperator.com might be a valid pseudonym identity. In this example, 3s7ah6n9q is the pseudonym username. Pseudonym usernames are used in lieu of the permanent username for privacy reasons, in order to hide the permanent username from observers. When the optional identity privacy support is not used, the non-pseudonym permanent identity is used on full authentication.

(3) Fast Re-authentication Usernames.

For example, 53953754@myoperator.com might be a valid fast re-authentication identity. In this case, 53953754 is the fast re-authentication username. Unlike permanent usernames and pseudonym usernames, fast re-authentication usernames are one-time identifiers, which are not re-used across EAP exchanges.

The first two types of identities are only used on full authentication and the last one only on fast re-authentication.

In the following, the generation of pseudonyms and fast re-authentication identities is described.

The first EAP exchange initiated by a terminal always uses the permanent username derived from the IMSI (International Mobile Subscriber Identity). The EAP server generates the pseudonym usernames and re-authentication usernames and sends them to the terminal, in an encrypted format, as part of the EAP exchange. The terminal can then use the received identities in subsequent EAP exchanges.

The format of the pseudonym identity and the fast re-authentication identity is opaque to the terminal—the terminal does not need to care how the server composes these identities. The terminal only uses the received identity string as-is. The fast re-authentication identity contains both a username portion and a realm name portion.

The 3GPP Technical Specification 33.234, "3rd Generation Partnership Project; Technical Specification Group Service and System Aspects; 3G Security; Wireless Local Area Network (WLAN) Interworking Security (Release 6)" (V 6.4.0, 2005-03), specifies the usage of the EAP-SIM and EAP-AKA protocols in the 3GPP environment. TS 33.234 specifies how the server generates pseudonyms and fast re-authentication identities. The identities include the IMSI of the subscriber, encrypted using Advanced Encryption Standard (AES) in Electronic Codebook (ECB) mode of operation with 128-bit keys. The temporary identity generation is described in the following, which is basically an excerpt of Section 6.4.1 of TS 33.234, by referring to FIGS. 2A and 2B.

In order to encrypt with AES in ECB mode, it is necessary that the length of the clear text is a multiple of 16 octets. This clear text is formed as follows:

1. A Compressed IMSI is created utilising 4 bits to represent each digit of the IMSI. According to TS 23.003, the length of the IMSI is not more than 15 digits (numerical characters, 0 through 9). The length of the Compressed IMSI shall be 64 bits (8 octets), and the most significant bits shall be padded by setting all the bits to 1.

For example:
IMSI=214070123456789
(MCC=214; MNC=07; MSIN=0123456789)
Compressed IMSI=0xF2 0x14 0x07 0x01 0x23 0x45 0x67 0x89

Observe that, at reception of a temporary identity, it is easy to remove the padding of the Compressed IMSI as none of the IMSI digits will be represented with 4 bits set to 1. Moreover, a sanity check should be done at reception of a temporary identity, by checking that the padding, the MCC and the MNC are correct, and that all characters are digits.

2. A Padded IMSI is created by concatenating an 8-octet random number to the Compressed IMSI.

A 128-bit secret key, Kpseu, is used for the encryption. The same secret key must be configured at all the WLAN AAA servers in the operator network so that any WLAN AAA server can obtain the permanent identity from a temporary identity generated at any other WLAN AAA server (see section 6.4.2 of TS 33.234). FIG. 2A summarises how the Encrypted IMSI is obtained.

Once the Encrypted IMSI has been generated, the following fields are concatenated, as is also illustrated in FIG. 2B:

Encrypted IMSI, so that a AAA server can later obtain the IMSI from the temporary identity.

Key Indicator, so that the AAA server that receives the temporary identity can locate the appropriate key to de-encrypt the Encrypted IMSI (see section 6.4.2 of TS 33.234).

Temporary identity Tag, used to mark the identity as temporary pseudonym or re-authentication identity. The tag should be different for identities generated for EAP-SIM and for EAP-AKA.

The Temporary Identity Tag is necessary so that when a WLAN AAA receives a user identity it can determine whether to process it as a permanent or a temporary user identity. Moreover, according to EAP-SIM/AKA specifications, when the Authenticator node (i.e. the AAA server) receives a temporary user identity which is not able to map to a permanent user identity, then the permanent user identity(if the AAA server recognizes it as a pseudonym) or a full authentication identity (if the AAA server recognizes it as a re-authentication id) shall be requested from the WLAN client. As the procedure to request the permanent user identity is different in EAP-SIM and EAP-AKA, the Temporary Identity Tag must be different for EAP-SIM pseudonyms or re-authentication identities and for EAP-AKA pseudonyms or re-authentication identities, so that the AAA can determine which procedure to follow.

The last step in the generation of the temporary identities consists on converting the concatenation above to a printable string using the BASE64 method described in section 4.3.2.4 of RFC 1421 ("Privacy Enhancement for Internet Electronic Mail: Part I: Message Encryption and Authentication Procedures" by J. Linn, February 1993). With this mechanism, each 6-bit group is used as an index into an array of 64 printable characters. As the length of the concatenation is 138 bits, the length of the resulting temporary identity is 23 characters, and no padding is necessary. Observe that the length of the Temporary identity Tag has been chosen to be 6 bits, so that it directly translates into one printable character after applying the transformation. Therefore, at reception of a user identity, the AAA server can recognise that it is a temporary identity for EAP-SIM or a temporary identity for EAP-AKA without performing any reverse transformation (i.e. without translating any printable character into the corresponding 6 bits).

Hence, in this way the pseudonyms and fast re-authentication identities are generated according to TS 33.234.

The UMA system may be exposed to so-called Denial-of-Service (DoS) attacks, as described above. In these attacks, the attacker attempts to bring down-network nodes by sending a very large amount of authentication-related messages. If the processing capacity of some network element is exceeded, the network element may not be able to server the legitimate authentication requests from ordinary terminals. Hence, the attacker may manage to deny the UMA service from legitimate users.

By sending IKEv2 and EAP-SIM or EAP-AKA messages to the UNC, a DoS attacker may try to bring down the UMA controller, AAA elements, such as intermediate AAA proxies or the AAA server, and even elements in the cellular network such as the HLR or the AuC. If the DoS attack brings down a HLR or an AuC, then not only the UMA service but also the GSM or UMTS service may be affected.

A general technique to resist DoS attacks is to apply rate limits. That is, a network control element may limit the rate at which authentication attempts are accepted for example from a given IP address.

DoS protection is discussed in Section 11.4 of the EAP-SIM document "Extensible Authentication Protocol Method for GSM Subscriber Identity Modules (EAP-SIM)" by H. Haverinen and J. Salowey, December, 2004 (http://www.ietf.org/internet-drafts/draft-haverinen-pppext-eap-sim-16.txt). In particular, the document specifies that the EAP-SIM server implementation should take DoS attacks into account and should take steps to limit the traffic that it generates towards the AuC, preventing the attacker from flooding the AuC and from extending the denial of service attack from EAP-SIM to other users of the AuC.

There are other general DoS resistance techniques, such as the cookie support in IKEv2 or client puzzles that are used in some protocols to make it harder to mount DoS attacks. Since the EAP-SIM and EAP-AKA protocols do not include cookies or client puzzles, they cannot be applied to the UMA environment.

Thus, there is a need to further improve security against DoS attacks.

It is noted that the problem described above does not only occur in connection with UMA, but can occur in all kind of networks requiring some kind of authentication. The problem was only identified in connection with UMA.

Another example where the same problem may occur is the 3GPP WLAN interworking environment. 3GPP has specified six WLAN interworking scenarios in Technical Report 22.934, "Feasibility study on 3GPP system to Wireless Local Area Network (WLAN) interworking (Release 6)". EAP-SIM and EAP-AKA authentication are used in scenarios 2 and 3. They are briefly summarized here.

Scenario 2 is also called "WLAN Direct IP Access" in the 3GPP specifications. It refers to basic network access authentication and IP access at WLAN hotspots. One of the main technical features of this scenario is SIM and USIM based authentication using EAP-SIM and EAP-AKA protocols. In 802.11 networks, the EAP-SIM or EAP-AKA protocols are transported over the WLAN interface using the IEEE 802.1x standard for port based network access control. This protocol is used as a part of the WiFi Protected Access (WPA) specifications. The WLAN Access Point operates as an EAP Authenticator and relays EAP requests and responses between the terminal and an AAA network. The EAP server resides at the home network and operates similarly as in the UMA case which is described above.

Scenario 3 is also known as "WLAN 3GPP IP Access" in the 3GPP specifications. Since WLAN hotspots cannot always considered as trusted networks, the WLAN 3GPP IP Access specifies how a Virtual Private Network (VPN) tunnel can be established between the terminal and a VPN gateway, which is hosted by the operator. The VPN gateway is known as the Packet Data Gateway (PDG) in the 3GPP specifications. Scenario 3 technology does not depend on WLAN or scenario 2 in any way, so the VPN tunnel can be established over any access technology. The VPN tunnel is very similar to the tunnel used in UMA, as described above.

SUMMARY OF THE INVENTION

Hence, it is an object of the present invention to solve the problem mentioned above and to further improve the resistance against DoS attacks.

This object is solved by a method for handling authentication requests in a network, wherein the authentication requests may have different types, the method comprising the steps of
   determining types of the authentication requests, and
   applying a policy for handling the received authentication requests based on the determined types of authentication requests.

Alternatively, the above object is solved by a network control element for handling authentication requests in a network, wherein the authentication requests may have different types, the network control element comprising:
   a receiving means for receiving authentication requests,
   a determining means for determining types of the authentication requests, and
   a policy applying means for applying a policy for handling the received authentication requests based on the determined types of authentication requests.

Thus, according to the present invention the type for a received authentication request is determined based on the kind of the authentication request, and a policy for handling of the authentication requests is applied based on the type.

That is, the policy may be adapted based on the type of the authentication request. Namely, if the authentication request is of a such a type which requires relatively large processing, the policy applied for this type may be such that the handling is performed with a low priority, e.g., a low rate limit may applied. Hence, it can be avoided that a network control element which receives the authentication request and has to handle it is flooded by such kind of authentication requests.

Thus, according to the invention, different policies are applied for handling authentication requests of different types.

Further advantageous developments are set out in the dependent claims.

For example, a policy may be applying a rate limit, as described above.

The type of the authentication request may be based on the type of the identity sending the authentication request. In this way, a type of the identity may be a permanent identity or a temporary identity. The temporary identity may be a pseudonym or a fast re-authentication identity.

Moreover, to the permanent identity a lower handling priority may be applied than to the temporary identity. For example, to the permanent identity may be applied a lower rate limit than to the temporary identity.

A further type of the authentication request may be an invalid authentication request. If the authentication request is of such a type, the authentication may be rejected.

Upon determining the type of the authentication, it may be checked whether a preliminary validity condition is fulfilled, and the type may be decided based on the result of the checking step.

The preliminary validity condition may be whether a cryptographically generated identity is valid or not, whether a message authentication code (MAC) is valid or not, whether the structure of an identity corresponds to a predetermined structure or not, whether a number of authentication attempts of a particular identity exceeds a threshold, or the like.

When it is determined that the above preliminary validity condition is not fulfilled, the type of the corresponding authentication request may be decided as invalid. Hence, the authentication may be rejected, as described above.

Moreover, the authentication requests may be put into different queues based on the type of the authentication requests, and in the applying step, different policies are applied for handling the requests in each queue.

BRIEF DESCRIPTION OF THE DRAWINGS

The invention is described by referring to the enclosed drawings, in which.

DETAILED DESCRIPTION OF THE PREFERRED EMBODIMENT

Figure 1:
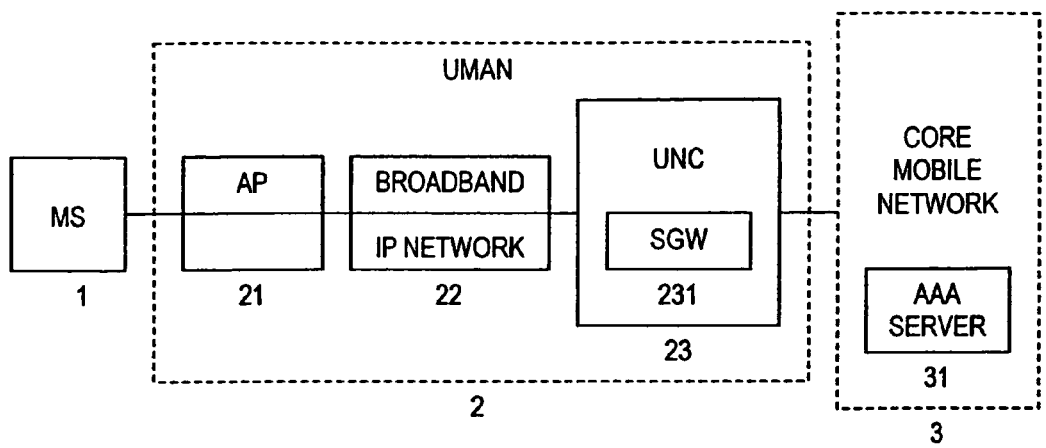
FIG. 1 shows the general UMA network architecture.
Figure 2A:
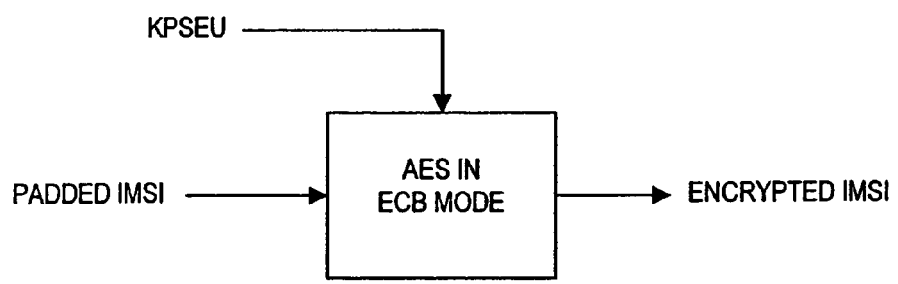
FIG. 2A illustrates the generation of an encrypted IMSI.
Figure 2B:
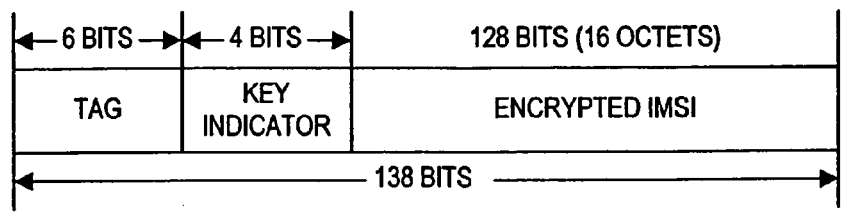
FIG. 2B illustrates the configuration of a user identity generated based on the encrypted IMSI,
   FIG. 3 a flowchart of a procedure for handling an authentication request according to a preferred embodiment of the invention, and
   FIG. 4 a basic structure of a UMA network controller according to the preferred embodiment of the invention.

In the following, a preferred embodiment of the present invention is described by referring to the attached drawings.

According to the preferred embodiment, the type of a received authentication request is determined. Based on this determined type, a policy for handling the received authentication request is applied. This handling of authentication request is performed in a UMA network controller (UNC) as an example for a network control element.

The types of the authentication requests may be such that an authentication can be performed locally or by means of a remote server, e.g., by using information from a Home Location Register (HLR) or an Authentication Center (AuC). In this case, the type can be divided between an authentication request from a permanent identity (requiring the additional information from HLR/AuC) and an authentication request from a temporary identity, which does not need external information, so that the authentication can be handled locally. The temporary identity may be a pseudonym or a fast re-authentication identity, as described above. The type may also be based on the validity of the authentication request, as will be described later.

According to the preferred embodiment, the policy for handling of the authentication requests is applying a rate limit based on the type of the authentication request.

In the following, a more detailed implementation of the present embodiment is described by referring to FIG. 3.

The identity generation specified in TS 33.234 can be used with the present embodiment. Advantageously, the identity format should also include a message authentication code (MAC) in order to protect the integrity of the string and provide a means to verify the validity of the string.

The UNC applies a strict rate limit to authentication requests that use a permanent identity. According to the present embodiment, these requests are placed in a low priority queue.

It is noted that according to the present embodiment, the rate limiting can be implemented using various well-known traffic shaping mechanisms, such as policing (or discarding excess packets), queuing (or delaying packets in transit), or congestion control (or manipulating the protocol's congestion mechanism).

According to the present prefeered embodiment, queuing is used. For example, the UNC may use the leaky bucket algorithm or the token bucket algorithm. By fixing the parameters of these algorithms, the UNC can limit the average rate at which authentication requests are sent from the queue. The parameters of the traffic shaping algorithm for the low priority queue are chosen so that the rate is low.

Concerning temporary identities, the keys used in temporary identity generation are provided to the UNC, so that it is able to decrypt the temporary identities (pseudonyms/re-authentication identities). Upon receipt of an authentication exchange with a temporary identity, the UNC decodes the temporary identity. If the identity format contains a MAC and the MAC is invalid, the UNC discards the authentication attempt.

If the identity format does not contain a MAC, the UNC checks whether the structure of the unencrypted identity is valid. If the unencrypted identity does not appear valid, the UNC discards the authentication attempt.

The structure of the identity can be checked in the following way: The IMSI is a string of decimal digits (0 through 9). It is composed of a 3-digit Mobile Country Code (MCC), a 2- or 3-digit Mobile Network Code (MNC) and a Mobile Subscriber Identification Number (MSIN). Hence, if the temporary identity format specified in 3GPP TS 33.234 is used, then the UNC can check the validity of the unencrypted identity by making sure that each 4-bit "nibble" of the unencrypted IMSI only contains decimal digits (0-9), or the padding nibble 0xF. The UNC can also check whether the MCC and the MNC portions of the unencrypted IMSI are valid. These codes indicate the mobile operator of the subscriber. If the UNC of the home operator is always used, then the UNC can check that the MCC and MNC of the home operator are used. The home operator is also indicated in the realm portion of the identity string, so the UNC can also check that the operator indicated by the realm portion is the same as the operator indicated by the MCC and MNC.

However, if the UNC successfully verifies that the temporary identity is valid and learns the embedded IMSI, then the UNC checks whether it has received a large number of requests with the given IMSI recently (here "large number" and "recently" are parameters that are chosen according to specific operational conditions). If this is the case, then the UNC applies a strict rate limit to such an authentication request. According to the present preferred embodiment, the request is placed in a low priority queue.

If the temporary identity is valid and there has not been many authentication attempts using the IMSI, then the UNC only applies moderate rate limiting. In a preferred embodiment, the request is placed in a high-priority queue. It is also possible to apply a stricter rate limit to requests with pseudonym identities, because they are used on full authentication. The rate limit on fast re-authentication identities can be less strict as the fast re-authentication does not risk the operation of the HLR/AuC (Home Location Register/Authentication Center).

Figure 3:
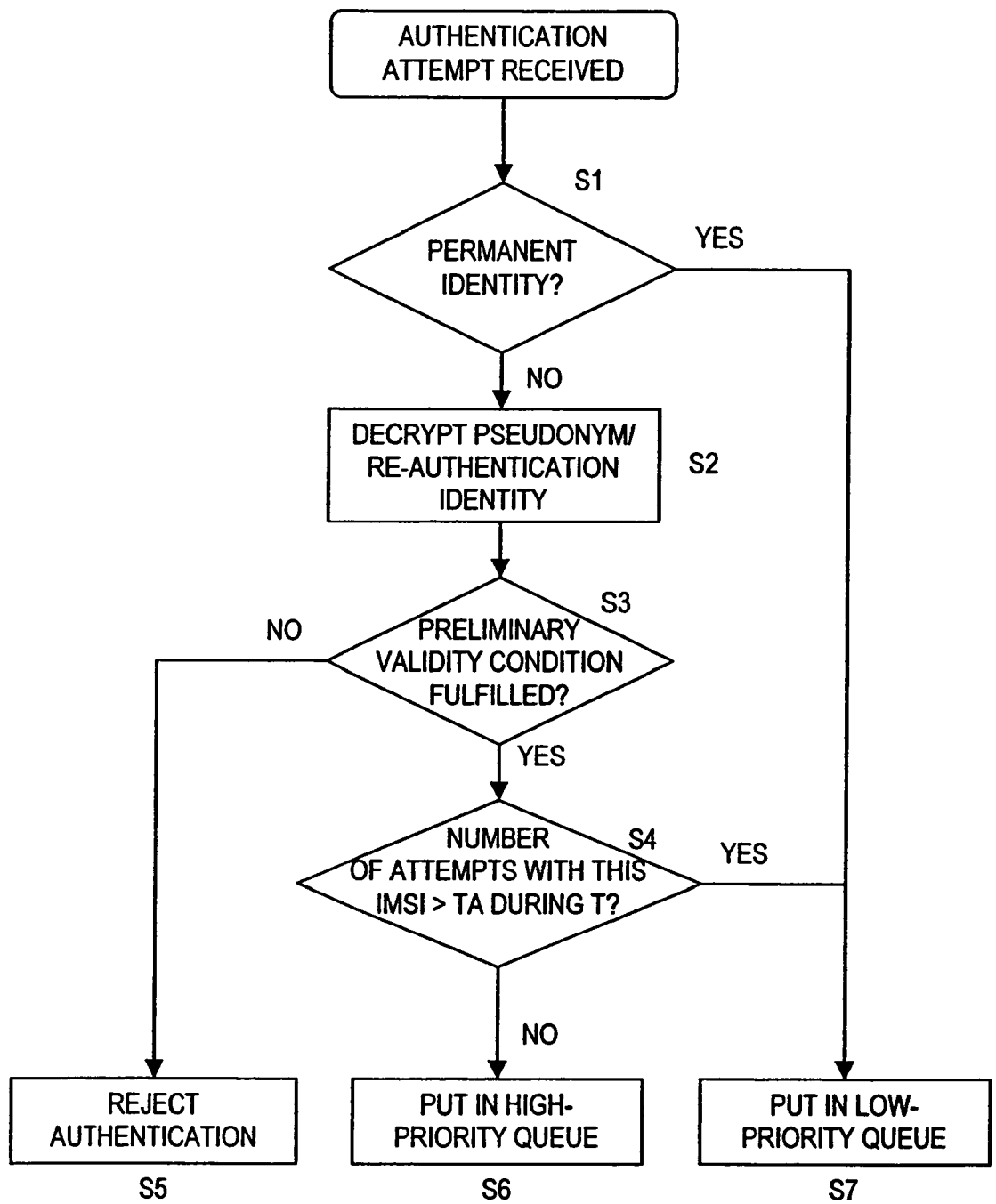

FIG. 3 shows a flowchart of a procedure according to a detailed example for the present embodiment. In particular, according to this embodiment the authentication requests are divided into three types or classes:

A first type in which no authentication is performed at all, namely in which the authentication is rejected. That is, in this case the rate is limited to 0 packets/bytes per second. This type relates to an invalid authentication request.

A second type in which the authentication request is put into a low-priority queue, i.e., in which the authentication is performed, but in which a certain rate limit is applied. According to the present embodiment, this type relates to a permanent identity.

A third type in which the authentication request is put in a high-priority queue, in which the authentication is performed without delay. That is, in this case no specific rate limit may be applied. This type relates to a temporary identity.

The procedure starts each time an authentication attempt is received, i.e., an authentication request is received at the UNC. In step S1 it is checked whether the identity by which the authentication request is sent is a permanent identity. As mentioned above, the authentication of a permanent identity requires a high amount of resources in the network. Therefore, if the identity is a permanent identity, the authentication request is put in the low-priority queue (step S7).

If the identity is not a permanent identity, the process advances to step S2 in which the pseudonym/re-authentication identity is decrypted. Thereafter, a preliminary validity condition is checked. Such a condition can be whether a MAC is valid or not, as described above. If the MAC is invalid, then the preliminary validity condition is not fulfilled, so that then the process advances to step S5, in which the authentication is rejected. If, however, the MAC is valid, the process advances to step S4.

Another example of the preliminary validity condition is whether the structure of the unencrypted identity is valid or not, as also described above.

In step S4, the number of attempts with the particular IMSI is evaluated. That is, it is checked whether there have been a lot of attempts with this IMSI recently. This is effected by comparing the number of attempts with this IMSI with a threshold TA, which were conducted during a certain time period T. In case the number exceeds the threshold TA, the process advances to step S7, in which the authentication request is put in the low-priority queue. Namely, in this case it is assumed that there is a possible DoS attack from the IMSI.

On the other hand, in case the number of attempts with this IMSI does not exceed the threshold, the process advances to step S6 in which the authentication request is put in the high-priority queue.

It is noted that the procedure show in FIG. 3 can be modified. For example, the authentication requests of permanent identities and from those identities which exceed the threshold do not have to be put in the same low-priority queue, i.e., do not have to regarded as being of the same type, but can be put into two queues (i.e., regarded as two different types), so that also these authentication requests can be treated with different priorities. Moreover, more than one threshold for determining. whether the number of attempts is too high can be provided, in order to have a further refined determination of the types.

Figure 4:
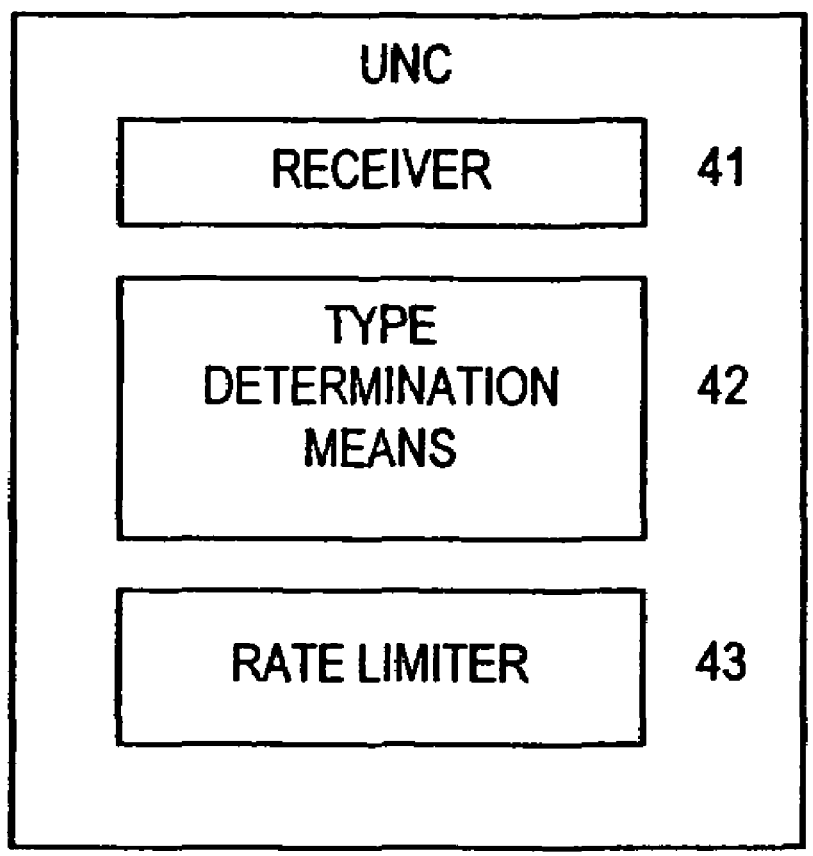

FIG. 4 shows a basic structure of the UMA network controller according to the present embodiment. The UNC comprises a receiving means 41, by which authentication requests are received. A type determination means 42 performs the type determination of the authentication requests, and a rate limiter (as an example for a policy applying means) 43 applies the rate limit to the authentication request.

Hence, according to the preferred embodiment of the present invention, the UNC applies adaptive rate limiting to EAP-SIM and EAP-AKA authentication exchanges (as examples for authentication requests). For this, the type of the authentication request is checked, i.e., it is evaluated whether the authentication request is sent by permanent identities, or temporary identities such as cryptographically generated pseudonyms or fast re-authentication identities. If an authentication request is sent from a temporary identity, then the UNC decodes the temporary identity and decides the applicable rate limit based on the validity of the identity and the IMSI.

Thus, according to the present embodiment, an effective rate limiting can be applied already at the UNC, which is beneficial as it reduces the possibilities of DoS attacks against the AAA network and the cellular network. Moreover, fast service can be provided to regular users that use pseudonyms and fast re-authentication identities. Strict rate limiting is mainly applied for the rare full authentication exchanges. Furthermore, when implementing the procedure according to the present embodiment, no changes are required to the terminal. Also, no changes are necessarily required to the AAA server. Even when the UNC uses the properties of cryptographically generated temporary identities to determine the type of the request, no changes are needed in the AAA server if the AAA server implements the temporary identity generation specified in TS 33.234. It is noted, however, that adding a MAC to the identities would further strengthen the mechanism, as described above.

When rate limiting is based on the properties of cryptographically generated temporary identities, an advantage of the invention is that it is very hard for an attacker to spoof or fake an authentication request such that the request would be placed in any other than the lowest priority queue.

The invention is not limited to the embodiment described above, and various modifications are possible.

For example, in the preferred embodiment a mobile station is described as an example for a terminal. However, the terminal is not limited to a mobile station but can be any kind of terminal.

Furthermore, in the preferred embodiment, rate limiting was described as an example for a policy for handling authentication requests. However, the invention is not limited to this. That is, according to the invention, different policies are applied for handling authentication requests of different types. Hence, any kind of policy can be applied, as long as by this policy the requests are processed differently, namely such that different types to be processed with different priority, throughput, different probability to discard, different quality etc.

The invention is not limited to UMA, but can be applied to any kind of network in which authentication requests are handled.

For example, the invention can also be applied to the 3GPP WLAN Interworking scenario 3, which is known as WLAN 3GPP IP Access. In this system, the operator hosts a Packet Data Gateway (PDG), which is an IPsec gateway. Tunnel establishment is based on IKEv2 and EAP-SIM or EAP-AKA, similar as described above in connection with UMA. The same DoS resistance technique can be applied by the PDG. The PDG can apply adaptive rate limiting based on the cryptographically generated identities, for example.

EAP-SIM and EAP-AKA can also be used in WLAN access authentication, as in 3GPP WLAN Interworking scenario 2. In this environment, EAP is run over IEEE 802.1x, and the WLAN access point operates as the EAP authenticator. The adaptive rate limiting can be implemented in the WLAN access point or in a AAA proxy server.

Thus, the network control element in which the method according to the invention is actually carried out, may be an IPsec gateway, a Packet Data Gateway (PDG), an UMA Network Controller, an Authentication, Authorisation and Accounting (AAA) proxy server, a Wireless Local Area Network Access Point (WLAN AP) or any other suitable network control element.

The invention is not limited to EAP-SIM and EAP-AKA protocols, but it can be applied to any authentication protocol for which it is possible to determine a type of the authentication request. For example, any Extensible Authentication Protocol (EAP) method which has a fast re-authentication procedure or which has different user identity formats may be protected with this invention.

The invention can also be realized by computer program product, which may be run on a processing device. The computer program product, i.e., the computer code may be stored on a medium, e.g., a memory card, a RAM (Random access memory) or a ROM (read only memory) or a harddrive. For example, the processing device may include the functions of the type determination means 2 and the rate applying means 43 shown in FIG. 4 and may be implemented in a network control element such as described above.

The invention claimed is:

1. A method comprising:
   determining, by a network control element, types of authentication requests in a network;
   applying a policy for handling received authentication requests based on the determined types of authentication requests, wherein the determining comprises determining the type of the authentication requests based on the type of identity sending the authentication requests, and wherein the type of the identity comprises one of a permanent identity and a temporary identity; and
   applying a lower handling priority to the permanent identity than to the temporary identity.

2. The method according to claim 1, wherein the applying comprises applying the policy that applies a rate limit.

3. The method according to claim 1, wherein the temporary identity comprises one of a pseudonym and a fast re-authentication identity.

4. The method according to claim 1, wherein the type of the authentication request comprises an invalid authentication request.

5. The method according to claim 4, wherein, when the type is the invalid authentication request, the authentication is rejected.

6. The method according to claim 1, wherein the determining comprises:
   checking whether a preliminary validity condition is fulfilled; and
   deciding the type based on the result of the checking.

7. The method according to claim 6, wherein the preliminary validity condition is whether a cryptographically generated identity is valid.

8. The method according to claim 6, wherein the preliminary validity condition is whether a message authentication code (MAC) is valid.

9. The method according to claim 6, wherein the preliminary validity condition is whether the structure of an identity corresponds to a predetermined structure.

10. The method according to claim 6, wherein the preliminary validity condition is whether a number of authentication attempts of a particular identity exceeds a threshold.

11. The method according to claim 6, wherein, in the deciding, the type is decided as invalid when the condition is not fulfilled.

12. The method according to claim 1, wherein, in the determining, the authentication requests are put into different queues based on the type of the authentication requests, and, in the applying, different policies are applied for handling the authentication requests in each queue.

13. An apparatus comprising:
receiver configured to receive authentication requests in a network;
a controller configured to
determine types of the authentication requests; and
apply a policy to the received authentication requests based on the determined types of authentication requests,
wherein the type of the authentication request is based on the type of an identity sending the authentication request,
wherein the type of the identity comprises one of a permanent identity and a temporary identity, and
wherein the controller is configured to apply a lower handling priority to the permanent identity than to the temporary identity.

14. The apparatus according to claim 13, wherein the policy comprises applying a rate limit.

15. The apparatus according to claim 13, wherein the temporary identity comprises one of a pseudonym and a fast re-authentication identity.

16. The apparatus according to claim 13, wherein the type of the authentication request comprises an invalid authentication request.

17. The apparatus according to claim 16, wherein the controller is configured to reject the authentication when the type is the invalid authentication request.

18. The apparatus according to claim 13, wherein the controller is configured to:
check whether a preliminary validity condition is fulfilled; and
decide the type based on the result of the checking.

19. The apparatus according to claim 18, wherein the preliminary validity condition is whether a cryptographically generated identity is valid.

20. The apparatus according to claim 18, wherein the preliminary validity condition is whether a message authentication code (MAC) is valid.

21. The apparatus according to claim 18, wherein the preliminary validity condition is whether the structure of an identity corresponds to a predetermined structure.

22. The apparatus according to claim 18, wherein the preliminary validity condition is whether a number of authentication attempts of a particular identity exceeds a threshold.

23. The apparatus according to claim 18, wherein the controller is configured to decide the type as invalid when the condition is not fulfilled.

24. The apparatus according to claim 13, wherein the controller is configured to
put the authentication requests into different queues based on the type of the authentication requests, and
apply different policies for handling the requests for each queue.

25. The apparatus according to claim 13, wherein the apparatus comprises one of an internet protocol security (IPsec) gateway, a packet data gateway (PDG), an unlicensed mobile access (UMA) network controller, an authentication, authorisation and accounting (AAA) proxy server, an authentication, authorisation and accounting (AAA) server, and a wireless local area network access point (WLAN AP).

26. A computer program, embodied on a computer readable medium, the computer program configured to control a processing device to perform:
determining types of authentication requests; and
applying a policy for handling received authentication requests based on the determined types of authentication requests, wherein the determining comprises determining the type of the authentication requests based on the type of identity sending the authentication requests, and wherein the type of the identity comprises one of a permanent identity and a temporary identity; and
applying a lower handling priority to the permanent identity than to the temporary identity.

27. The computer program according to claim 26, wherein the processing device comprises one of an internet protocol security gateway, a packet data gateway (PDG), an unlicensed mobile access (UMA) network controller, an authentication, authorisation and accounting (AAA) proxy server, an authentication, authorisation and accounting (AAA) server, and a wireless local area network access point (WLAN AP).

28. An apparatus comprising:
receiving means for receiving authentication requests in a network;
determining means for determining types of the authentication requests; and
policy applying means for applying a policy to the received authentication requests based on the determined types of authentication requests, wherein the type of the authentication request is based on the type of an identity sending the authentication request, and wherein the type of the identity comprises one of a permanent identity and a temporary identity; and
applying means for applying a lower handling priority to the permanent identity than to the temporary identity.

* * * * *